(12) United States Patent
Martin (10) Patent No.: US 7,340,593 B2
(45) Date of Patent: Mar. 4, 2008

(54) HARD DRIVE RESET CACHE

(75) Inventor: Todd R. Martin, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 581 days.

(21) Appl. No.: 10/821,578

(22) Filed: Apr. 9, 2004

(65) Prior Publication Data

US 2005/0240821 A1    Oct. 27, 2005

(51) Int. Cl.
G06F 11/00 (2006.01)
G06F 15/177 (2006.01)
(52) U.S. Cl. ............... 713/1; 711/141; 714/36; 713/2
(58) Field of Classification Search ............. 713/1, 713/2
See application file for complete search history.

(56) References Cited

U.S. PATENT DOCUMENTS

| | | | |
|---|---|---|---|
| 5,210,875 A | 5/1993 | Bealkowski et al. | 395/700 |
| 5,701,477 A | 12/1997 | Chejlava, Jr. | 395/652 |
| 5,860,083 A * | 1/1999 | Sukegawa | 711/103 |
| 5,974,573 A | 10/1999 | Martin | 714/48 |
| 6,449,716 B1 | 9/2002 | Rickey | 713/2 |
| 6,640,316 B1 | 10/2003 | Martin et al. | 714/36 |
| 7,073,054 B2 * | 7/2006 | Kim et al. | 713/2 |
| 2002/0026571 A1 | 2/2002 | Rickey | 713/2 |
| 2002/0166059 A1 | 11/2002 | Rickey et al. | 713/200 |
| 2003/0014619 A1 | 1/2003 | Cheston et al. | 713/1 |
| 2004/0015634 A1 | 1/2004 | Alexander et al. | 710/305 |
| 2004/0162950 A1 * | 8/2004 | Coulson | 711/141 |

OTHER PUBLICATIONS http://linux-sxs.org/bedtime/bootproc.html, printed Aug. 19, 2004.

* cited by examiner

*Primary Examiner*—Rehana Perveen
*Assistant Examiner*—Fahmida Rahman
(74) *Attorney, Agent, or Firm*—Hamilton & Terrile, LLP; Michael Rocco Cannatti (57) ABSTRACT

A method, computer system, and apparatus perform an expedited boot and operating system load operation from a hard drive device. Rather than waiting for storage media in a storage device to be fully operational before retrieving software modules and/or data required for initial loading of an operating system, the software modules and/or data are stored in a non-volatile memory in the storage device and are immediately available to the central processing unit. When the busy bit in a drive status register is set by the hard drive microcontroller, the BIOS code attempts to retrieve the requested data from a non-volatile memory in the hard drive, such as a non-volatile cache memory which may be configured to provide coherent data storage, even across a power loss to the hard drive.

14 Claims, 5 Drawing Sheets

HARD DRIVE RESET CACHE

BACKGROUND OF THE INVENTION

1. Field of the Invention

The present invention relates to the field of information handling systems. In one aspect, the present invention relates to a method and apparatus for expediting data retrieval from a storage device, such as a hard disk drive, during startup operations.

2. Description of the Related Art

As the value and use of information continues to increase, individuals and businesses seek additional ways to process and store information. One option available to users is information handling systems. An information handling system generally processes, compiles, stores and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated and how quickly and efficiently the information may be processed, stored or communicated. The variations in information handling systems allow for information handling systems to be general or configured for a specific user or specific use such as financial transaction processing, airline reservations, enterprise data storage or global communications. In addition, information handling systems may include a variety of hardware and software components that may be configured to process, store and communicate information and may include one or more computer systems, data storage systems, and networking systems.

Information handling systems are well known in the art, and include examples such as personal computers, servers, laptop computer with docking stations, and other computer systems. Information handling systems in general, and Dell computer systems in particular, have attained widespread use throughout the world in providing computing products for a wide range of personal and business needs. A personal computer system can typically be defined as a desktop, floor standing, or a portable microcomputer that is comprised of a system unit having one or more central processing units (CPU) and associated volatile and non-volatile memory, including random access memory (RAM) and Basic Input Output System (BIOS) memory. Typically, a personal computer system also includes additional system and/or peripheral devices, such as, by way of example, a video display controller, a video display terminal (also known as a "system monitor"), a keyboard, one or more diskette drives, a pointer device, and an optional printer. Other system and/or peripheral devices typically connected to personal computer systems include one or more fixed storage devices, such as hard disk drive devices, external storage devices, Redundant Arrays of Inexpensive Disks (RAID) systems, ATA hard drives and the like. While the system and/or peripheral devices, such as storage devices, may include a disk cache memory for storing recently used data, theses technologies do not span a power loss event at the storage device. As a consequence, "boot up" operations that occur during startup can be impeded with such conventional systems which must wait for the devices to be operational before boot up operations can be completed.

In particular, when a user activates a computer power switch, or presses a reset button, the computer "boots" itself. Booting initiates an automatic start program routine that clears memory, executes diagnostics by executing a Power-On Self Test (POST) which checks the hardware (memory, Hard Drive Controllers, CPU, etc.), loads a computer operating system software program into memory from hard disk storage or other storage devices such as CD ROM, and executes other well known routines that prepare the computer for operation. This process is initiated by executing a set of programs called the Basic Input Output System (BIOS) code that is stored in non-volatile memory of the computer. The BIOS facilitates the transfer of data and instructions between a CPU and peripheral devices such as disk drives. Computer systems may be designed to perform functional tests from the BIOS every time the computer is turned on.

In operation, the BIOS program initializes all aspects of an information handling system, from CPU registers to device controllers to memory contents. The BIOS program must know how to load an operating system and to start execution of the operating system. To load the operating system, the bootstrap program typically starts by retrieving and loading a series of loading mechanics or modules to retrieve the operating system code from a storage device and load the operating system code into RAM within the information handling system. For example, with PC systems, the BIOS program starts by locating a master boot record (MBR), which stores the configurable aspects of the bootstrap program. The MBR is typically stored at a fixed location, such as the first sector of the hard drive disk or CD-ROM. Upon executing the MBR program, the BIOS program next checks for a boot loader program (or pointer thereto) in the MBR and then executes the boot loader program to determine what operating system to load and where on the storage device to load it from. The boot loader program is programmed with the location on the storage device of a kernel, which the boot loader then executes to complete loading of the operating system code. Alternatively, the boot loader program may be programmed with the location of a chainloader which is used to look for other boot loader programs that are used to boot other operating systems. As the kernel is loaded, the BIOS program transfers control to an initial address provided by the operating system kernel, and the operating system is loaded into RAM within the information handling system. Once loaded and initialized, the operating system controls the execution of programs and may provide services such as resource allocation, scheduling, input/output control and data management.

Figure 1:
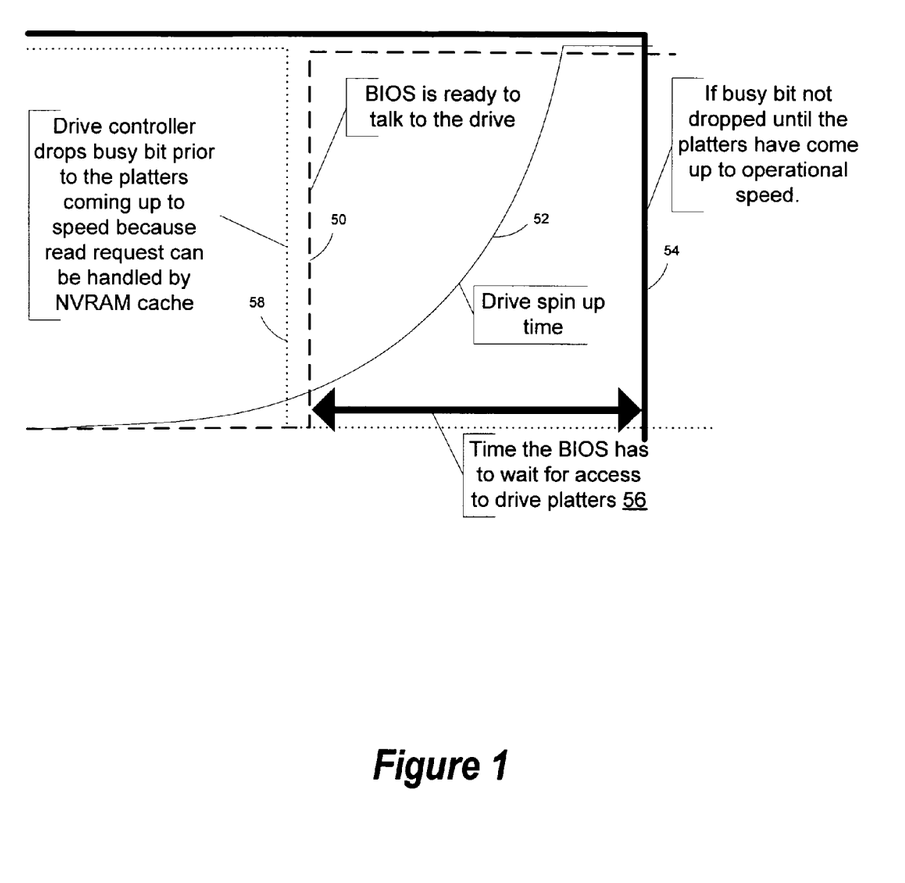
FIG. 1 shows a timeline depiction of where drive controller busy signal(s) may be dropped in relation to the BIOS program being ready to access the drive.

With existing personal computer systems, the BIOS program completes its POST diagnostics tests and is often ready to begin data retrieval from a data storage device before the device is operational. For example, FIG. 1 shows that the BIOS program may be prepared to begin loading the operating system code (at vertical line 50) before the hard drive (where the operating system code is stored) is ready to be accessed (as indicated at vertical line 54). As a consequence, the BIOS stalls (delay 56) while waiting for the hard drive to be operational, thereby inducing a longer boot time. Such a delay contributes to the impression that the personal computer is slow to start up. Therefore, a need exists for methods and/or apparatuses for improving the system boot up operations to quickly and efficiently provide data from system and/or peripheral devices, such as storage devices. Further limitations and disadvantages of conventional systems will become apparent to one of skill in the art after reviewing the remainder of the present application with reference to the drawings and detailed description which follow.

SUMMARY OF THE INVENTION

In accordance with the present invention, a system and method are provided for efficiently retrieving data from peripheral or system components in an information handling system during startup operations by storing the required startup data in a non-volatile memory of the peripheral or system component, where said non-volatile memory may be immediately accessible, even if the primary storage media in the peripheral system or component is not. In a selected embodiment, BIOS handling of the operating system load operations from a storage device is expedited by storing the initial OS loading modules in a non-volatile memory in the storage device. As a result, even before the storage media (such as storage disks in a hard drive device) is operational or otherwise prepared for data access operations, the required startup information (such as MBR, boot load and kernel programs) that has been stored in the non-volatile memory is immediately available for retrieval and execution by the central processor unit. Through use of non-volatile memory devices, such as flash memory, battery-backed CMOS memory or the like, bootup operations are expedited by storing startup data in memory devices that span a power loss. In addition, use of a non-volatile cache memory to hold start-up data provides the flexibility to allow changes to the stored startup data, such as when hard drive is reorganized or the cached sectors are updated during an operating system upgrade.

In accordance with various embodiments of the present invention, a method and apparatus provide expedited startup operations for a computer system using a non-volatile memory (such as a battery-backed CMOS cache memory) to store a copy of a startup program module that is also stored on a hard disk drive. During startup, a processor initiates startup operations by executing BIOS commands to begin loading the startup program module into system memory from the hard disk drive. If the storage media in the disk drive is not prepared to provide the startup program module, the non-volatile cache memory provides the module instead. In one implementation, the startup program module is an initial program load module (such as a master boot record, a boot load program and a kernel program, etc.) that is executed by the processor to load an operating system. The disk drive may be a standard disk drive or a RAID array of drives. When the non-volatile memory maintains coherency between the disk drive memory and the non-volatile cache memory, a threshold count may be used to clear a sector in the non-volatile memory only when the threshold count has been met. Thus, various embodiments of the present invention provide expedited data retrieval, startup operations that bridge a power loss event, coherent storage of startup program modules and/or an improved sector clearance protocol that avoids unnecessary sector clearance operations.

The objects, advantages and other novel features of the present invention will be apparent from the following detailed description when read in conjunction with the appended claims and attached drawings.

DETAILED DESCRIPTION

A method and apparatus for improved data retrieval during startup is described. While various details are set forth in the following description, it will be appreciated that the present invention may be practiced without these specific details. For example, selected aspects are shown in block diagram form, rather than in detail, in order to avoid obscuring the present invention. Some portions of the detailed descriptions provided herein are presented in terms of algorithms or operations on data within a computer memory. Such descriptions and representations are used by those skilled in the data processing arts to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 2:
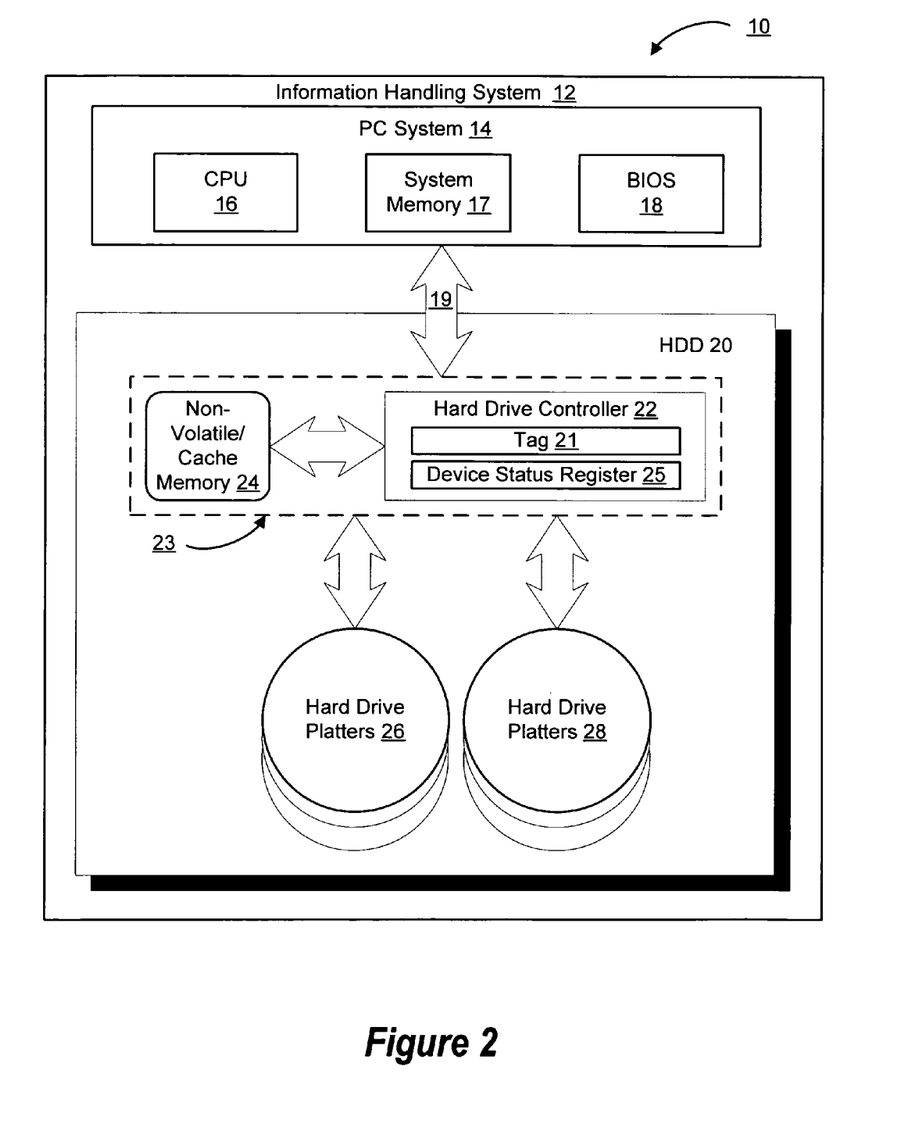
FIG. 2 is a block diagram of an apparatus for providing expedited data retrieval in an exemplary computer system.

Referring now to FIG. 1, a block diagram depicts a method and apparatus for providing expedited data retrieval in an exemplary computer system 10. The computer system 10 may be found in many forms including, for example, mainframes, minicomputers, workstations, servers, personal computers, internet terminals, notebooks, embedded systems and other information handling systems. Personal computer (PC) systems, such as those compatible with the x86 configuration, include desktop, floor standing or portable versions. A typical information handling system 12 includes a PC system 14 having a microprocessor or central processing unit (CPU) 16, system memory 17 and BIOS memory 18, and the PC system is connected to a variety of hardware components, such as a hard disk drive 20, through an interface 19, such as an IDE interface. As will be appreciated, the computer system 10 may also include other peripheral or system components, such as a cache memory in the PC system 14 to facilitate quicker access between the processor 16 and main memory 17. Other examples of peripheral and system components include speaker systems, keyboards, traditional I/O devices (such as display monitors, mouse-type input devices, floppy disk drives, hard disk drives, CD-ROM drives, modems, printers), network interfaces, terminal devices, televisions, sound devices, voice recognition devices, electronic pen devices, and mass storage devices such as tape drives, CD-R drives or DVDs. Thus, persons skilled in the art will recognize that the foregoing components and devices are used as examples for sake of conceptual clarity and that various configuration modifications are common. The peripheral devices usually communicate with the processor over one or more buses and/or bridges.

The BIOS memory 18 in the PC system 14 is a non-volatile memory, such as ROM or flash memory, that stores software modules, or "routines," known as the Basic Input/Output System (BIOS) program that test the computer system 10 using diagnostics routines, sometimes collectively referred to as the Power On Self Test ("POST") when power is supplied the computer system 10. During the POST diagnostics routines, the BIOS program runs through all the known components of the computer system 10—such as the processor 16, the memory 17, the keyboard, and so on—to test and determine whether they are operating properly. If the BIOS diagnostics run properly, the BIOS program then begins executing the Initial Program Load ("IPL") operation, which begins the process of transferring control of the computer system 10 from the BIOS program to the operating system. At startup, the operating system software must be loaded into system memory 17 from a storage device, such as the hard drive device 20.

As illustrated, the hard disk drive 20 may include hard drive platters 26, access to which is controlled by the hard drive controller 22. In another embodiment, the hard disk drive 20 may include multiple hard drive platters 26, 28, and/or may be implemented as a RAID system of multiple disk drives. Whether one or more hard drive platter components are used, the hard drive controller 22 controls access to and from the platter(s). For example, at power up, the controller 22 may set a busy bit in a drive status register 25 while the drive platters are coming up to operational speed. This bit is checked by the CPU 16 during any attempt to access data from the hard disk drive 22 to prevent an access when the device 20 is not operational.

In particular, when an information handling system 12 is powered up, both the PC system 14 and storage device 20 begin boot up operations, typically beginning with initial diagnostics tests, such as POST. Because the disk drive 20 requires time for the platters (e.g., 26) to start up and reach operational speed (as indicated with line 52 shown in FIG. 1), attempts to access the data storage device 20 by the PC system 14 have conventionally been prevented until such time as the platters have reached operational speed by waiting for the busy bit to be reset before performing data access operations on the device 20 (as indicated in line 54 in FIG. 1). The resulting delay (as indicated at line 56 in FIG. 1) can slow down startup operations (such as operating system code load operations) when the system diagnostics have previously been completed and the BIOS is ready to retrieve the OS code (as indicated at line 50 in FIG. 1).

The present invention reduces or eliminates the delay 56 by providing the storage device 20 with an immediately accessible memory 24 for holding the data that is retrieved during startup operations. For example, the hard drive 20 may include a non-volatile memory 24. To control access to the memory 24, the controller 22 may include a tag storage array 21 to keep track of which memory addresses are stored in the memory 24. As indicated with the dashed enclosure block 23, the memory 24 may be coupled to, or integrated with, the hard drive controller 22 for storing startup data, such as data that is requested by the PC system 14 during boot up operations. Rather than having to wait for the drive platters 26 to reach operational speed before retrieving the operational program load modules (such as the master boot record, boot load, kernel, etc.), the initial program load modules are stored in the non-volatile memory 24 for expedited delivery to the BIOS program when it requests the initial program load modules (as indicated at line 50 in FIG. 1). In a selected embodiment of the present invention, the drive controller 22 is able to drop the busy bit in the device status register 25 before the platters 26 are at full operational speed (as indicated at line 58 in FIG. 1) because the initial program load routines have been stored in the non-volatile memory 24, and are thus available earlier when the BIOS is ready to retrieve the initial program load modules (as indicated at line 50 in FIG. 1). In this way, the storage device 20 is able to expedite delivery of startup data before such time as the storage media 26 in the device 20 are fully operational using a non-volatile cache memory 24 to store the startup data. By holding the startup data in a non-volatile memory, the present invention permits data retrieval over a power loss event.

In a selected embodiment, operating system software is loaded more efficiently during the boot up operation by storing the initial loading modules for the operating software code in the non-volatile memory 24. Because the initial program load modules for a given operating system do not change and are usually or always stored in the same location and address in the hard disk drive device 20, the present invention exploits the stability of this data placement by holding the initial program load modules in a non-volatile memory which is immediately available to BIOS during startup, even if the disk drive platters are not yet fully operational. As will be appreciated, the present invention can be applied with other contexts and with other storage devices having internal storage media that require some minimum time to initiate before data can be retrieved from the media by storing the data in a startup memory which can be more quickly accessed than the storage media to thereby expedite data retrieval.

Referring back to FIG. 1, the present invention permits startup data to be available before the storage media is operational. Thus, the busy bit may be reset sooner (as indicated at line 58). While FIG. 1 shows in timeline form an example of how data retrieval is expedited by dropping a busy bit prior to the BIOS being ready to access the drive, it will be appreciated that an advantage of the present invention is obtained by shortening the data access time required so that data is retrieved before the drive platters are at their fully operational speed.

Where the startup memory 24 is implemented as a cache memory, the present invention provides the ability for the initial program load modules to be reprogrammed or updated. For example, when an update service pack is installed for an operating system, one or more sectors of the initial program load modules stored on the platters of the storage device 20 may be changed. When this occurs, coherency between the cache memory 24 and the data stored on the hard drive platters 26 may be maintained such that the updated sectors for the hard drive are also updated on the cache, thereby providing an updated and correct operating system mode operation during the next boot up.

Figure 3:
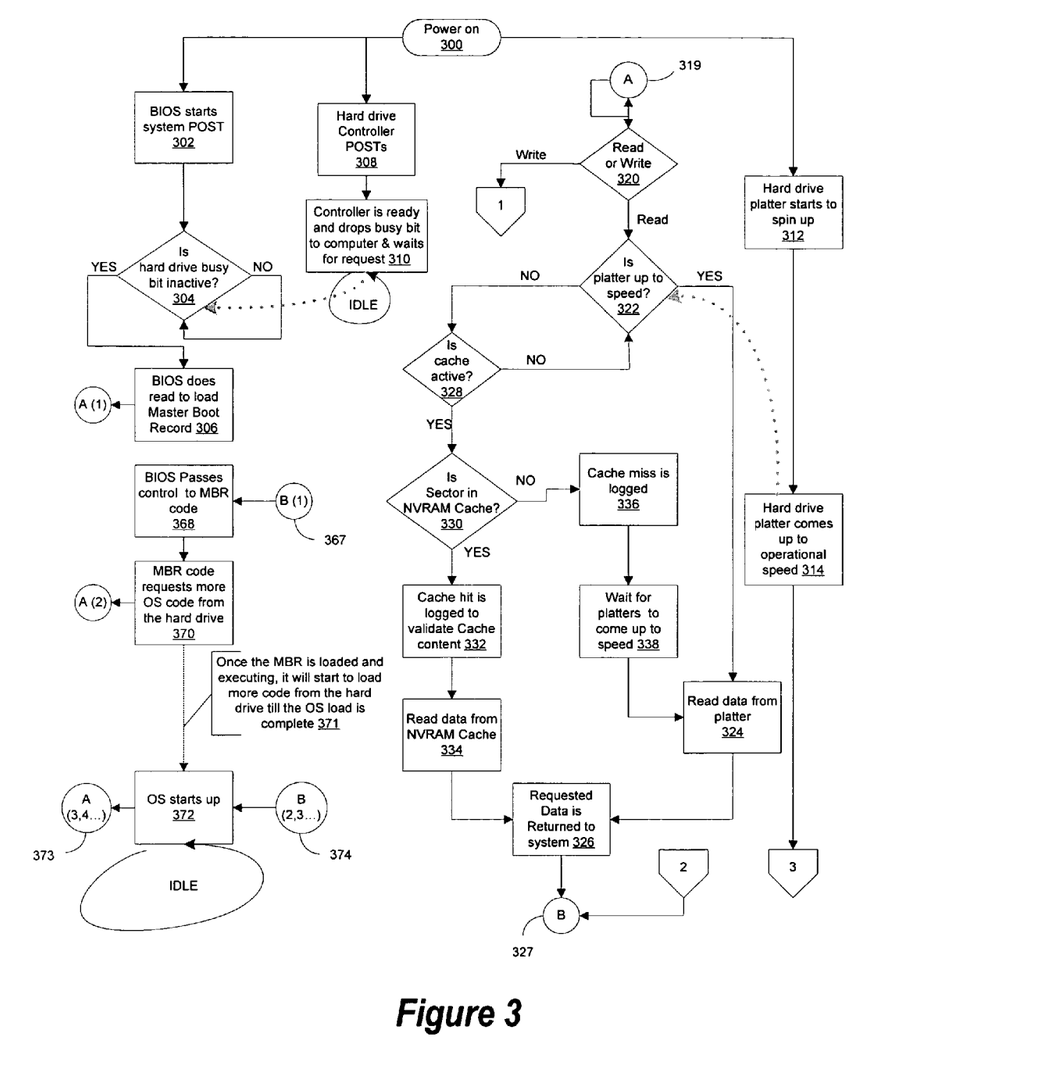
FIG. 3 illustrates an exemplary methodology for performing expedited data retrieval from a storage device.

Turning now to FIG. 3, an exemplary methodology is illustrated for performing expedited data retrieval from a storage device in accordance with the present invention. As will be appreciated, the methods and processes described herein may be executed under control of instructions, programs, code or other software modules that may be contained in the BIOS memory 18, system memory 17, non-volatile memory 24 or any other microcontroller memory—such as controller ROM memory (not shown), and that are made available to the CPU 16 and/or drive controller 22 for purposes of performing the methodology of the present invention. When an information handling system is powered on 300, the various components of the system are supplied with power. In response, the system components enter a startup mode. For example, a PC system 14 executes the BIOS program from memory 18 and begins executing POST diagnostics to test the system components at step 302. Simultaneously, other components in the system are initialized. For example, a storage device controller performs diagnostics 308 and activates the storage media, such as by beginning platter spin up in the hard drive 312. Rather than waiting for the hard drive platters to reach their operational speed, the drive controller resets the busy bit, thereby indicating to the PC system 14 that the device 20 is ready for a data access (step 310).

At the PC system 14, the BIOS completes the system diagnostics (step 302) and then detects if the hard drive is ready for an access by detecting if the busy bit has been reset (step 304). When the busy bit is inactive or reset, the BIOS program is able to expeditiously proceed with data retrieval from the storage device 20. For example, operating system load operations may be commenced when the BIOS program performs a read operation to the storage device 20 in order to load the master boot record (step 306). When the device 20 receives such a read request (decision 320), the requested data is read directly from the platter 324 if it is determined that the platter is up to speed (decision 322). However, if the platter is not operational, a cache read attempt is attempted by determining if the non-volatile memory is active (decision 328). If not, the read operation must be delayed until the platter is up to speed (decision 322) or the cache becomes active (decision 328), which ever comes first.

If it is determined that the cache is active (decision 328), the controller determines if the sector specified in the read request is located in the non-volatile memory (decision 330). If the requested sector is in the non-volatile memory, a cache hit is logged to validate the cache contents (block 332), and then the requested data is read from the non-volatile memory 334 and returned to the system 326. On the other hand, if it is determined at decision 330 that the requested sector is not held in the non-volatile memory, a cache miss is logged (step 336) and the controller waits for the platters 26 to come up to speed (step 338), at which time the requested data is read from the platter (step 324) and returned to the system (step 326).

As will be appreciated, the foregoing sequence of read steps are repeated whenever a read instruction is issued to the data storage device 20. This is indicated with the parenthetical numbers, where A(1) indicates a first read operation, A(2) indicates a second read operation, B(1) indicates a first data delivery, and so on. For example, once the master boot record has been retrieved from the non-volatile memory (steps 320, 322, 328, 330, 332, 334 and 326), the retrieved MBR program is returned to the PC system via B(1) (step 367) where the BIOS program passes control to the MBR code (step 368), which then requests more operating system code from the hard drive via A(2) (step 370), thereby restarting the data read operation (entry point 319). In this way, the controller 22 repeats the sequence of steps of determining if the requested data sector is located in the non-volatile memory or in the data platters and performing the necessary data retrieval steps. This sequence of read operations may be repeated once the MBR is loaded and executed so that the additional modules from the initial program load modules are retrieved from the device 20 until the operating system load operation is complete (step 371), at which time the operating system starts up (step 372).

Once the operating system is installed, any data read requests issued to the device 20 proceed through a read operation 373 which initiates the sequence of data retrieval steps 320-338 such that the data provided by the disk drive (at event 327) is returned to the operating system (via step 374).

While the foregoing description indicates that the non-volatile cache memory is potentially accessed any time that the device platters are not up to operational speed, the present invention may also be implemented so that accesses to the non-volatile memory are performed only during startup or boot up operations, thereby eliminating the requirement of attempting cache retrievals when the operating system has already been loaded into system memory. By confining non-volatile memory access attempts to situations where boot up operations are underway, overall system performance is improved by eliminating cache accesses once the operating system is fully loaded. However, with such an embodiment, data write operations should be monitored to detect if any cached data is being revised, in which case a cache update should occur.

Figure 4:
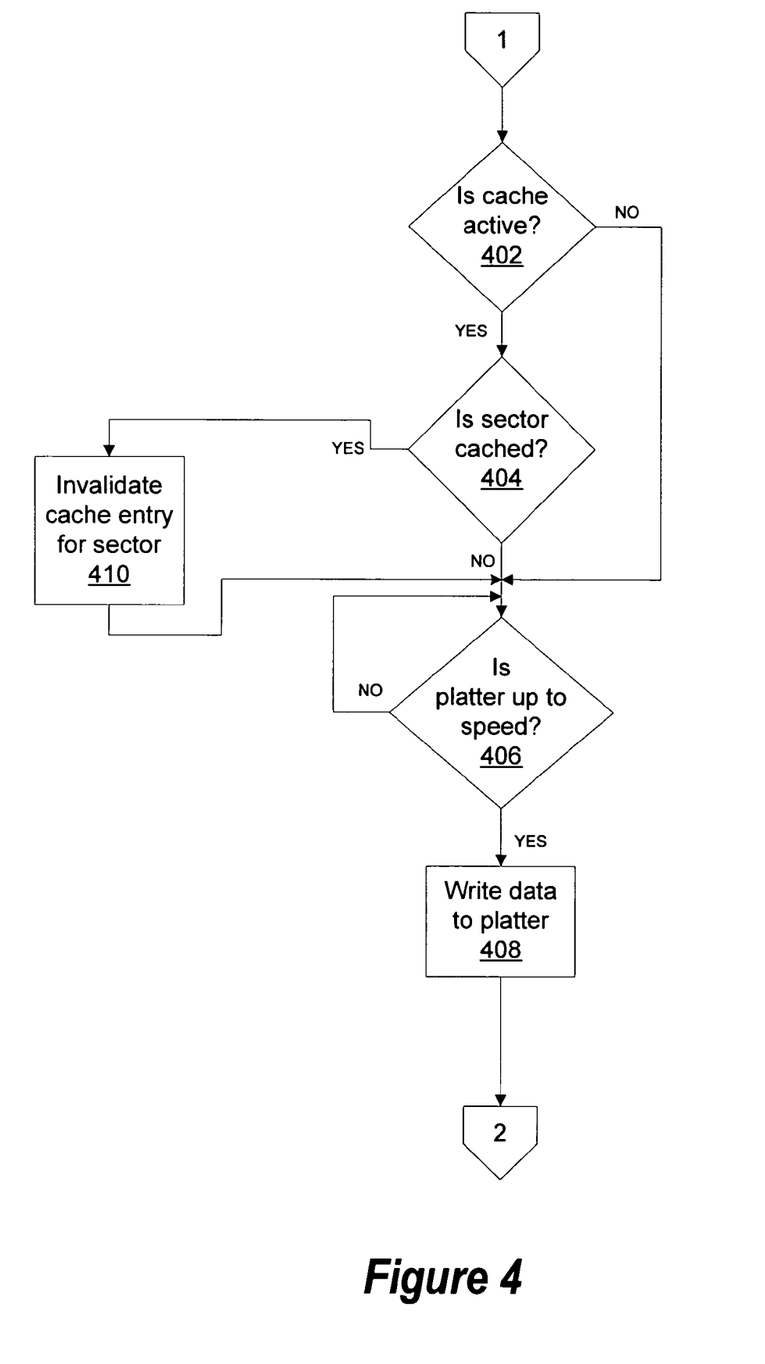
FIG. 4 illustrates an exemplary methodology for data write operations performing in connection with a load operation.

FIG. 4 illustrates an exemplary methodology for data write operations performed in connection with the storage of operating system data on a storage device 20 (such as a hard disk drive) when an operating system is first stored on a storage device 20 (such as during installation or manufacture of the information handling system) or when an operating system is modified (such as through installation of a service pack update to the operating system). In such situations, it is important that the cache memory 24 be updated to reflect the new operating system information that is stored on the storage device 20. When a write operation to the storage device is performed, an initial determination is made as to whether the cache memory is active (decision 402). If the cache is not active, data is written to the platter (step 408) once the platter has reached its operational speed (decision 406). However, if it is determined that the cache is active (decision 402), the controller for the storage device determines if the sector being written to is in the storage device has already been cached (decision 404). If the sector for the write data is not cached, the data is written to the platter (step 408) once the platter is up to speed (decision 406). However, if the sector for the write data is cached, the controller invalidates the cache entry in the tag for that sector (step 410) before writing the data to the platter (406, 408). As will be appreciated, the write data can be used to update the cache and the cache entry in connection with the writing of the data to the platters. Alternatively, the cache memory may be updated during the next load operation when a cache miss is detected.

As will be appreciated, and it may be unnecessary to include a determination of whether the platter is up to speed (decision 406), though this step is useful for storage devices that utilize power management techniques to power down the storage media. For example, in a hard disk drive device 20, the platters 26 may not need to be spinning all the time if data access is not required. But if the platters are not maintained in a continuous operational state, it is helpful to include a platter speed detection step whenever accessing the data storage device 20.

Figure 5:
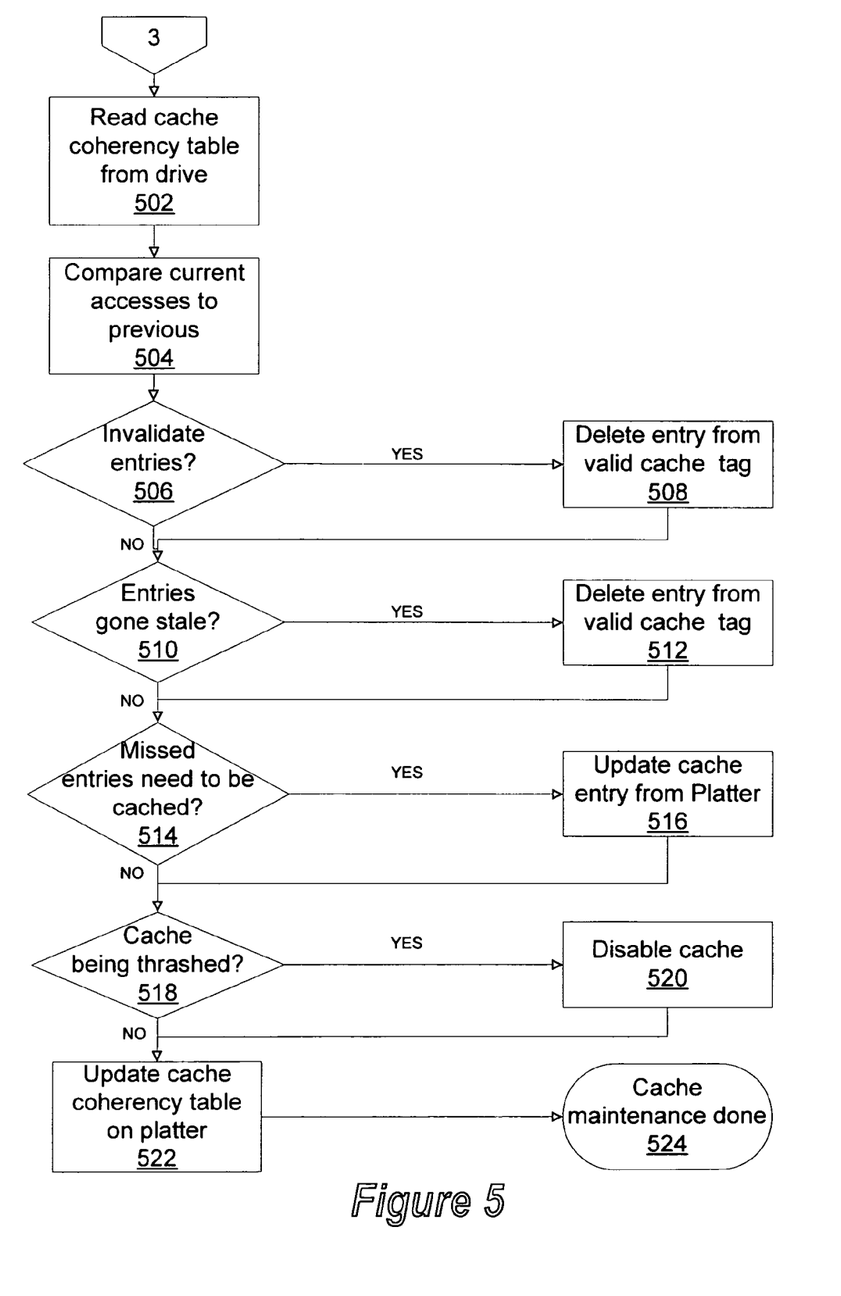
FIG. 5 illustrates an exemplary methodology for performing cache maintenance operations in connection with a non-volatile cache memory that is used for expediting boot up data retrieval from a data storage device.

In connection with the cache-based memory embodiment of the present invention, FIG. 5 illustrates an example methodology for maintaining cache coherency between the cache memory 24 and the information stored on the hard drive platters 26. For example, once the hard drive platters 26 reach operational speed (step 314 in FIG. 3), the cache maintenance operations proceed by initially retrieving a cache coherency table from the drive 26 (step 502). As will be appreciated, the cache coherency table stores information pertaining to previous cache memory accesses. This information is used for comparison to a current cache memory access (step 504). For example, the drive controller 22 may perform the comparison of current accesses to previous accesses using an on-board cache memory (not shown) in the controller 22. Alternatively, a separate tag memory array may be used by the controller for holding cache entry information.

Cache maintenance may be implemented with any or all of the following operations. If it is determined that the cache tag or table includes an invalid entry (decision 506), the invalid entry is deleted from the cache tag (step 508). For example, the controller 22 may determine that an entry in the cache tag is invalid upon detecting that new data has been written to a sector identified by the tag. If it is determined that one of the entries in the cache tag or maintenance table has expired or gone stale (decision 510), the stale entry is deleted from the tag (step 512). If it is determined that there has been a cache miss (decision 514), such as when a data access to drive platter 26 was not available in the cache memory 24, then the cache memory 24 is updated with the data from the platter 26 and the cache tag entry is also updated (step 516). If the controller detects that the cache is being thrashed (decision 518), such as when the accesses to the drive platter 26 are too random for valid caching, the cache may be disabled (step 520).

While the cache maintenance operations described herein may be used to implement a coherency protocol for the cache memory 24, it will be appreciated that any of a variety of cache coherency protocols may be used in connection with the present invention. However implemented, the updated cache coherency table may be stored on the platter (step 522) for subsequent retrieval, may be stored in a tag array or may otherwise be maintained at the data storage device 20 for purposes of performing cache maintenance (step 524).

As described herein, a cache coherent memory is provided for a data storage device for assisting with startup data retrieval. When implemented with a non-volatile memory, the startup data memory at the data storage device is valid over a power loss event. The cache coherency aspect of the present invention provides a flexible memory to accommodate hard drive reorganization events, as well as more limited disk drive sector updates.

In a selected embodiment of the present invention, update operations for the cache memory 24 may advantageously be controlled to set a minimum threshold number of misses before the cache memory for a particular sector is cleared. This can prevent an innocuous cache miss event from triggering the clearing of the cache memory for that sector. For example, a utility program might erroneously indicate a boot code cache error. By setting a minimum threshold count requirement, multiple cache misses must be detected before the implicated sector in the cache memory 24 is cleared. Due to the number of potential sectors that can be stored in the cache memory, it may be advantageous to store a table of threshold sector values on the drive platters so that they can be retrieved during cache maintenance operations to determine if the affected cache sectors need to be updated or cleared.

The present invention may also be advantageously implemented with a variety of data storage devices. For example, RAID storage devices typically include multiple platter systems 26, 28, and it is common for data to be stored on the platters using a striping technique to distribute a sequence of bytes across a plurality of platter systems. While this striping technique is useful for improving the overall data retrieval performance from the RAID devices, the distribution of data across multiple platter systems can extend the time required for data retrieval. By including a non-volatile cache memory as part of, or connected to, the RAID microcontroller, the initial or startup data modules stored on the platters 26, 28 can be stored in the cache memory and made available to processor requests once the BIOS program is ready.

The above-discussed embodiments include software that performs certain tasks. The software discussed herein may include script, batch, or other executable files. The software may be stored on a machine-readable or computer-readable storage medium such as a disk drive or microcontroller memory, and is otherwise available to direct the operation of the computer system as described herein and claimed below. Storage devices used for storing software modules in accordance with an embodiment of the invention may be BIOS memory, NVRAM memory, ROM, magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the software may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple software modules into a single module or may impose an alternate decomposition of functionality of modules. For example, a software module for calling sub-modules may be decomposed so that each sub-module performs its function and passes control directly to another sub-module.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

While the system and method of the present invention has been described in connection with the preferred embodiment, it is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A computer system for performing expedited startup operations, comprising:
    a processor;
    a system startup memory coupled to the processor;
    a basic input/output system (BIOS) memory coupled to the processor, the BIOS memory comprising instructions for initiating startup operations; and
    a hard disk drive storage device, comprising
        a storage media comprising at least one drive platter for storing a program module that is loaded in the system startup memory during startup operations,
        a non-volatile cache memory for storing a copy of the program module stored on the storage media,
        a microcontroller memory for storing a module that maintains coherency between the storage media and the non-volatile cache memory;
        a threshold table stored in the hard disk drive storage device, said threshold table containing, for at least one sector of the storage media, a minimum threshold count value, wherein the module clears a sector in the non-volatile cache memory only if a cache miss count meets or exceeds the minimum threshold count value for that sector; and
        a microcontroller for controlling access to the storage media and the non-volatile cache memory, said microcontroller configured to retrieve the program module from the non-volatile cache memory in response to a read request from the processor if the storage media is not operational when the read request is received by the hard disk drive storage device.

2. The computer system of claim 1, where the cache memory comprises a battery-backed CMOS memory.

3. The computer system of claim 1, where the program module comprises an initial program load module that is loaded into the system startup memory and executed by the processor to load an operating system for the computer system.

4. The computer system of claim 3, where the initial program load module comprises a master boot record, a boot load program and a kernel program.

5. The computer system of claim 1, where the hard disk drive storage device comprises a RAID array.

6. A method for retrieving a program module from a first hard disk drive storage device during startup operations, comprising:
    executing BIOS instructions for initiating startup operations;
    initiating operating system load operations by requesting the program module from the first hard disk drive storage device comprised of a first storage media and a non-volatile cache storage media;
    retrieving said program module from the non-volatile cache storage media if the first storage media is not operational to provide said program module; and
    maintaining cache coherency between the first storage media and the non-volatile cache storage media by storing a threshold table in the first hard disk drive storage device, said threshold table containing, for at least one sector of the first storage media, a minimum threshold count value, that is used to clear a sector in the non-volatile cache storage media only if a cache miss count meets or exceeds the minimum threshold count value for that sector.

7. The method of claim 6, wherein the non-volatile cache storage media comprises a cache memory.

8. The method of claim 7, where the cache memory comprises a battery-backed CMOS memory.

9. The method of claim 6, where the program module comprises an initial program load module that is loaded into a system startup memory and executed by a processor to load the operating system for a computer system.

10. The method of claim 9, where the initial program load module comprises a master boot record, a boot load program and a kernel program.

11. The method of claim 6, further comprising executing the program module to load the operating system into a system memory.

12. In an information handling system, a disk drive storage device, comprising:
    at least one drive platter for storing a program module,
    a non-volatile cache memory for storing a copy of the program module, and
    a microcontroller for controlling access to the drive planer and the non-volatile cache memory, said microcontroller configured to retrieve the program module from the non-volatile cache memory in response to a read request from a processor if the drive platter is not operational when the read request is received by the disk drive storage device, wherein the microcontroller executes a coherency program to maintain coherency between the drive platter and the non-volatile cache memory by accessing a threshold table stored in the disk drive storage device, said threshold table containing, for at least one sector of at least one drive platter, a minimum threshold count value, wherein the coherency program clears a sector in the non-volatile cache memory only if a cache miss count meets or exceeds the minimum threshold count value for that sector.

13. The disk drive storage device of claim 12, where the non-volatile cache memory comprises a battery-backed CMOS memory.

14. The disk drive storage device of claim 12, where the program module comprises a master boot record that is loaded into a system startup memory and executed by the processor to load an operating system.

* * * * *